United States Patent
Kim et al.

(10) Patent No.: US 12,049,842 B2
(45) Date of Patent: Jul. 30, 2024

(54) COOLANT CONTROL MODULE

(71) Applicants: Hyundai Motor Company, Seoul (KR); Kia Corporation, Seoul (KR); Hanon Systems, Daejeon (KR); Hanon Systems EFP Korea Inc., Asan-si (KR)

(72) Inventors: Yeonho Kim, Seoul (KR); Jae Yeon Kim, Hwaseong-si (KR); Hoyoung Jeong, Daegu (KR); Ho Sung Kang, Daejeon (KR); Do-Hyun Kim, Asan-si (KR); Oh-Sang Shin, Asan-si (KR); Sung-Hwan Choi, Asan-si (KR); Sang Hyun Lee, Daejeon (KR); Seong Woo Jeong, Daejeon (KR); Jungbum Choi, Daejeon (KR); Jeong Wan Han, Daejeon (KR)

(73) Assignees: Hyundai Motor Company, Seoul (KR); Kia Corporation, Seoul (KR); Hanon Systems, Daejeon (KR); Hanon Systems EFP Korea Inc., Asan-si (KR)

( * ) Notice: Subject to any disclaimer, the term of this patent is extended or adjusted under 35 U.S.C. 154(b) by 0 days.

(21) Appl. No.: 18/246,948

(22) PCT Filed: Sep. 7, 2021

(86) PCT No.: PCT/KR2021/012145
§ 371 (c)(1),
(2) Date: Mar. 28, 2023

(87) PCT Pub. No.: WO2022/065751
PCT Pub. Date: Mar. 31, 2022

(65) Prior Publication Data
US 2023/0358159 A1    Nov. 9, 2023

(30) Foreign Application Priority Data
Sep. 28, 2020    (KR) .................. 10-2020-0125745

(51) Int. Cl.
*F01P 5/10*    (2006.01)
*F01P 7/14*    (2006.01)
(Continued)

(52) U.S. Cl.
CPC    *F01P 5/10* (2013.01); *F01P 7/14* (2013.01); *F16K 11/105* (2013.01); *F01P 2007/146* (2013.01); *F16K 31/53* (2013.01)

(58) Field of Classification Search
CPC .......... F01P 5/10; F01P 7/14; F01P 2007/146; F16K 11/105; F16K 31/53
See application file for complete search history.

(56) References Cited

U.S. PATENT DOCUMENTS

| 2012/0168138 A1 | 7/2012 | Myers et al. |
| 2017/0152957 A1* | 6/2017 | Roche .................. F16K 11/085 |

(Continued)

FOREIGN PATENT DOCUMENTS

| CN | 210153318 U | * | 3/2020 |
| CN | 210153318 U | | 3/2020 |

(Continued)

*Primary Examiner* — Syed O Hasan
(74) *Attorney, Agent, or Firm* — Slater Matsil, LLP

(57) ABSTRACT

An embodiment coolant control module includes a housing including a coolant inlet configured to receive a coolant, a coolant outlet configured to discharge the coolant, an internal passage connecting the coolant inlet and the coolant outlet, and a pump mounting part adjacent to the coolant outlet. The coolant control module further includes a control valve disposed inside the housing and configured to change a direction of the coolant, a coolant pump coupled to the pump mounting part of the housing, a driving motor unit mounted on the housing, connected to the control valve, and configured to drive the control valve, and a controller mounted on the housing, connected to the coolant pump and (Continued)

the driving motor unit, and configured to control an operation of the coolant pump and the driving motor unit.

20 Claims, 25 Drawing Sheets

(51) Int. Cl.
*F16K 11/10* (2006.01)
*F16K 31/53* (2006.01)

(56) References Cited

U.S. PATENT DOCUMENTS

2017/0373359 A1* 12/2017 Krull ................... H01M 10/613
2019/0323413 A1* 10/2019 Lee ........................... F01P 7/14

FOREIGN PATENT DOCUMENTS

| KR | 101765578 B1 | | 8/2017 |
| KR | 20180072781 A | | 6/2018 |
| KR | 101934723 B1 | * | 1/2019 |
| KR | 101934723 B1 | | 1/2019 |
| KR | 10211927 B1 | * | 5/2020 |
| KR | 102115927 B1 | | 5/2020 |

* cited by examiner

COOLANT CONTROL MODULE

CROSS-REFERENCE TO RELATED APPLICATIONS

This application is a national stage application of International Application No. PCT/KR2021/012145, filed on Sep. 7, 2021, which claims priority to Korean Patent Application No. 10-2020-0125745, filed on Sep. 28, 2020, which applications are hereby incorporated herein by reference.

TECHNICAL FIELD

The present invention relates to a coolant control module.

BACKGROUND

Recently, due to energy efficiency and environmental pollution problems, there is a demand for the development of eco-friendly vehicles that may substantially replace internal combustion engine vehicles.

Eco-friendly vehicles are largely divided into electric vehicles or hydrogen vehicles that use a battery, a fuel cell as an energy source, and hybrid vehicles that are driven using an engine and a battery, or the like. Such an eco-friendly vehicle includes not only an engine cooling system that manages cooling and temperature raising of the engine, but also an electric device cooling system that manages the heat of electrical components including an electric motor.

The electric device cooling system mainly cools power electronics, actuators, a hybrid starter generator (HSG), or the like, using coolant, and has a structure that increases the temperature of the battery by causing the coolant to bypass a radiator through a bypass circuit, and at the same time passing through the battery using waste heat of the power electronics (PE) in the cold season.

However, parts for controlling the flow of coolant that control the flow of coolant in the electric device cooling system of an eco-friendly vehicle should satisfy various purposes, such as heating, cooling, and waste heat recovery, from a plurality of water supply module components, but has a problem in that due to limitations of a layout space in a vehicle, the difficulty of arranging each component, designing a hose route, and connecting them increases, in mounting each component on a vehicle, a lot of man-hours are required to individually mount and connect each component and hose, and due to the complicated route, the flow resistance on the coolant side is high, and as a result, a high load is applied to the coolant pump.

KR 10-1765578 B1, published on Jul. 10, 2012, (Published on 2012 Jul. 10) is related to subject matter discussed herein.

SUMMARY

The present invention relates to a coolant control module. Particular embodiments relate to a coolant control module capable of integrating and connecting various parts used for cooling and heating in an eco-friendly vehicle.

Embodiments of the present invention provide a coolant control module having advantages of reducing the number of parts and man-hours by integrally connecting each part constituting a cooling system, increasing installation convenience through modularization, reducing a load of a coolant pump, and increasing a scalability of coupling of parts.

An exemplary embodiment of the present invention provides a coolant control module including a housing having at least one coolant inlet into which coolant flows and at least one coolant outlet through which coolant is discharged, an internal passage connecting the coolant inlet and the coolant outlet, and a pump mounting part adjacent to the coolant outlet, a control valve provided inside the housing to switch a direction of the coolant, a plurality of coolant pumps coupled to the pump mounting part of the housing, a driving motor unit mounted on the housing and connected to the control valve to drive the control valve, and a controller mounted on the housing and connected to the coolant pump and the driving motor unit to control an operation of the coolant pump and a driving unit.

One side of the housing may be provided with a controller mounting part communicating with an inside thereof, and the controller mounting part may be provided with a controller.

The housing may be provided with a valve accommodating part communicating with the inside in the controller mounting part, and the control valve may be inserted into the valve accommodating part.

The coolant control module may further include a driving gear unit mounted on the housing and connecting the driving motor unit and the control valve.

One side of the housing may be provided with a controller mounting part communicating with an inside thereof, and a valve accommodating part communicating with the inside in the controller mounting part, and the control valve may be inserted into the valve accommodating part, the driving gear unit may be mounted on an inlet side of the valve accommodating part, the controller may be mounted on the controller mounting part spaced apart from one side of the driving gear unit, and the driving motor unit may be disposed on one side of the controller and may be mounted in the housing.

The controller may be provided with a through hole penetrating through both sides, and a drive shaft of the driving motor unit may pass through the through hole of the controller and be connected to the drive gear unit.

The coolant control module may further include a cover on which the driving motor unit is mounted and disposed on one side of the controller and coupled to the housing.

The pump mounting part of the housing may be provided with a first connector to a pump terminal of a coolant pump, the controller mounting part may be provided with a second connector connected to the controller, and the first connector and the second connector may be connected to each other.

The coolant pump may include a motor housing, a stator disposed inside the motor housing, a rotor spaced apart from the inside of the stator, an impeller housing coupled to the motor housing, and an impeller inserted into and seated in the impeller housing, coupled to the rotor and rotating together, and one side of the impeller housing may be provided with a pump connector connected to a 3-phase terminal of the stator and the other side thereof may be provided with a pump terminal connected to the first connector of the housing.

The control valve may be a 3-way control valve controlling a flow of coolant in three directions, and the housing may be provided with one coolant inlet and two coolant outlets corresponding to ports of the 3-way control valve.

The control valve may be a 3-way control valve controlling a flow of coolant in three directions, and a pair of 3-way control valves may be provided, and the housing may be provided with four coolant inlets and two coolant outlets corresponding to the ports of the pair of 3-way control valves.

The control valve may be a 4-way control valve controlling a flow of coolant in four directions, and the housing may be provided with two coolant inlets and two coolant outlets corresponding to ports of the 4-way control valve.

The housing may be connected to an internal passage on an outlet side of the coolant and provided with a branch passage through which the coolant flows.

The control valve may be a 6-way control valve controlling a flow of coolant in six directions, and the housing may be provided with four coolant inlets and two coolant outlets corresponding to ports of the 6-way control valve.

The coolant control module may further include a reservoir tank in which the coolant is accommodated, in which the housing may be coupled to the reservoir tank, and the coolant inlet of the housing may be connected to the reservoir tank.

According to a coolant control module according to an exemplary embodiment of the present invention, it is possible to reduce a size and weight of a cooling system by removing hoses or pipes or reducing a length of the pipes through integration of parts constituting the cooling system.

In addition, it is possible to reduce the number of parts and assembly man-hours of the cooling system, increase the mounting convenience, and improve the performance and durability of the cooling system.

In addition, it is possible to lower the flow resistance of a coolant side acting on the cooling system, and thus, reduce a load applied to a coolant pump.

DETAILED DESCRIPTION OF ILLUSTRATIVE EMBODIMENTS

Hereinafter, a cooling module according to embodiments of the present invention having the configuration as described above will be described in detail with reference to the accompanying drawings.

Figure 1:
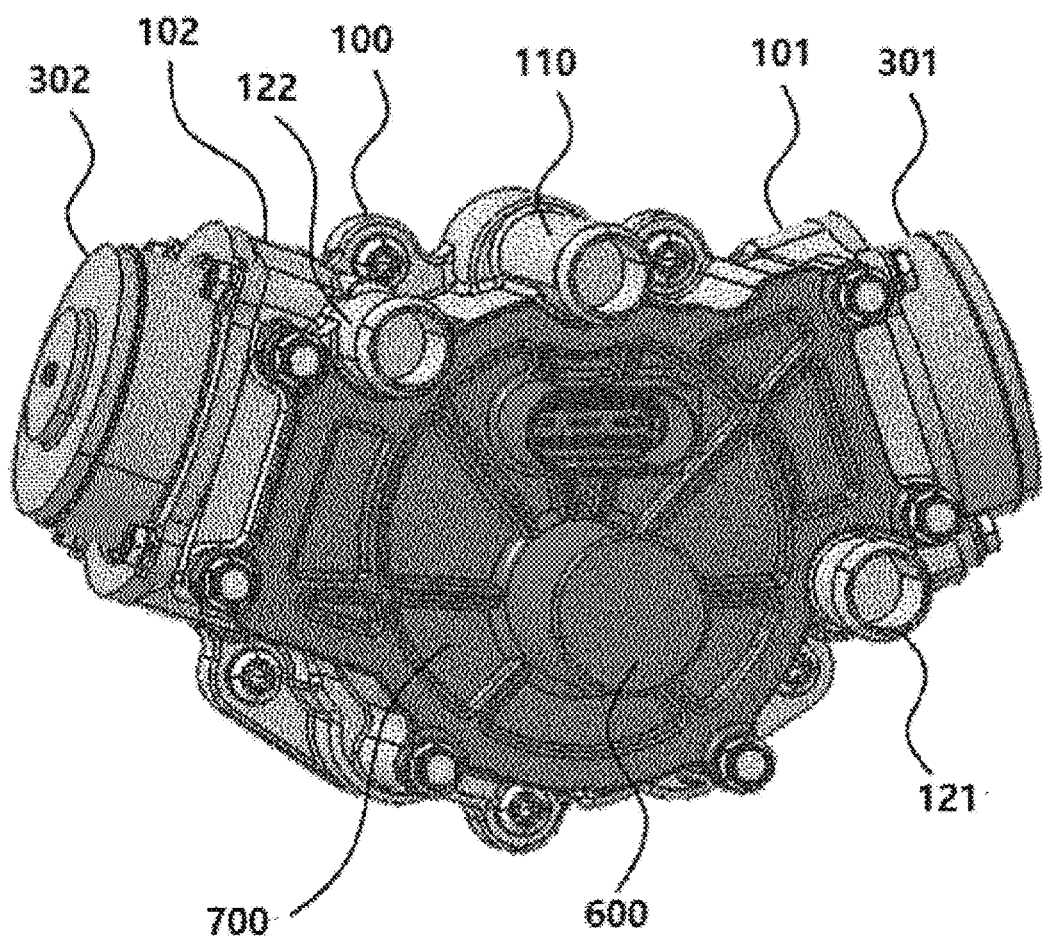
FIGS. 1 and 2 are an assembled perspective view and an exploded perspective view illustrating a coolant control module according to a first exemplary embodiment of the present invention.
Figure 2:
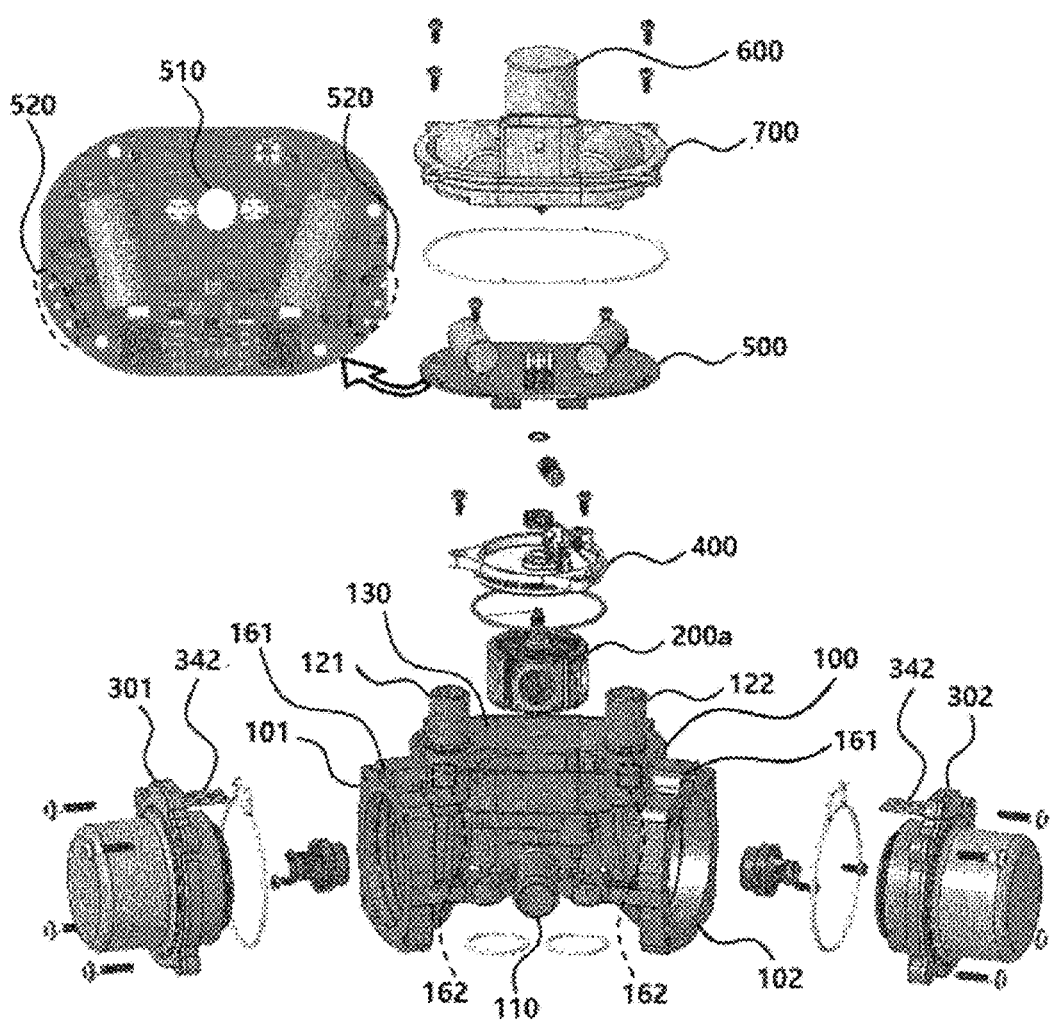
Figure 3:
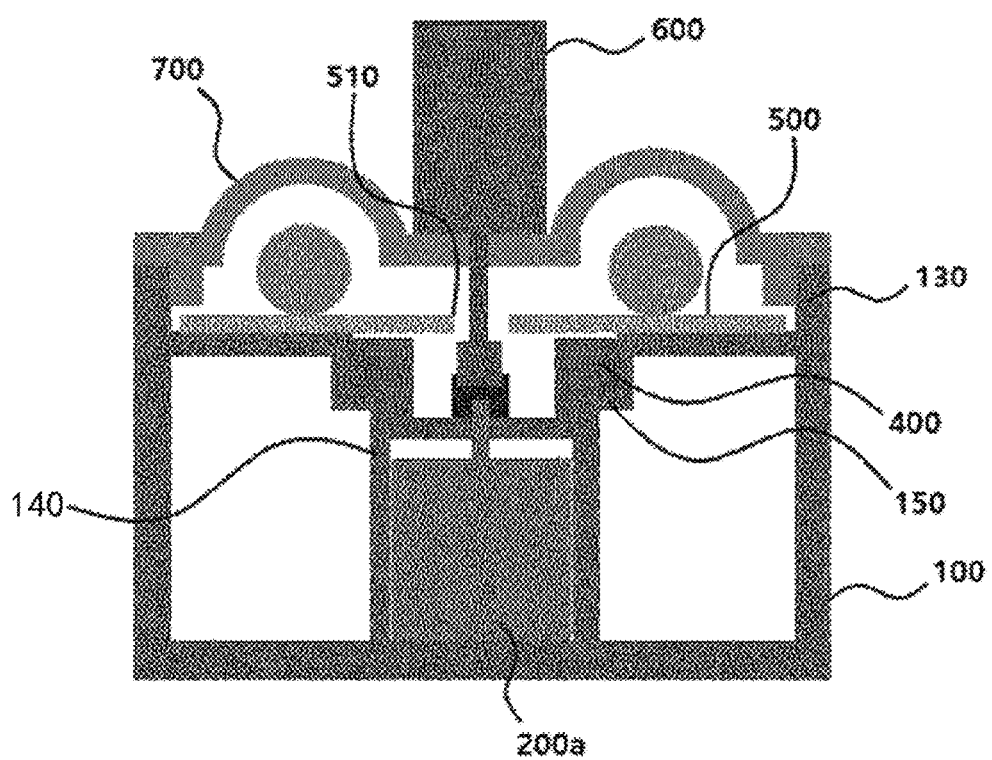
FIG. 3 is a front cross-sectional view of an assembled state of FIG. 2.
Figure 4A:
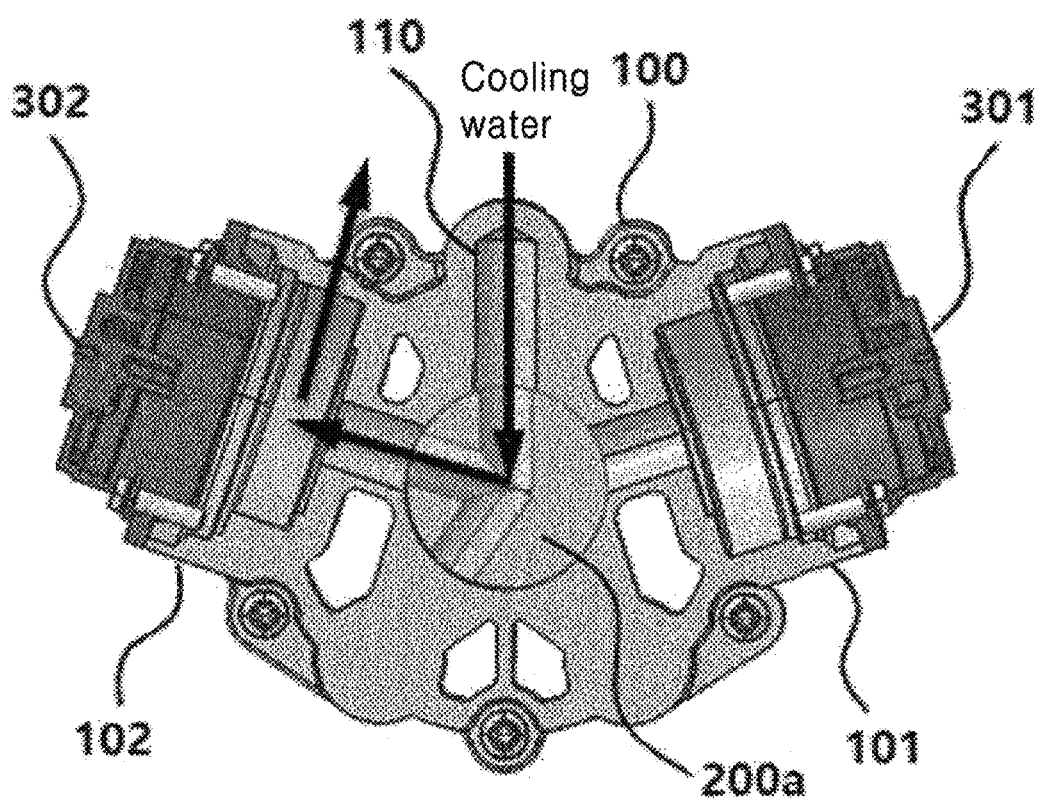
FIGS. 4A and 4B are front cross-sectional views of FIG. 1 illustrating a flow of coolant under control of a control valve in the coolant control module according to the first exemplary embodiment of the present invention.
Figure 4B:
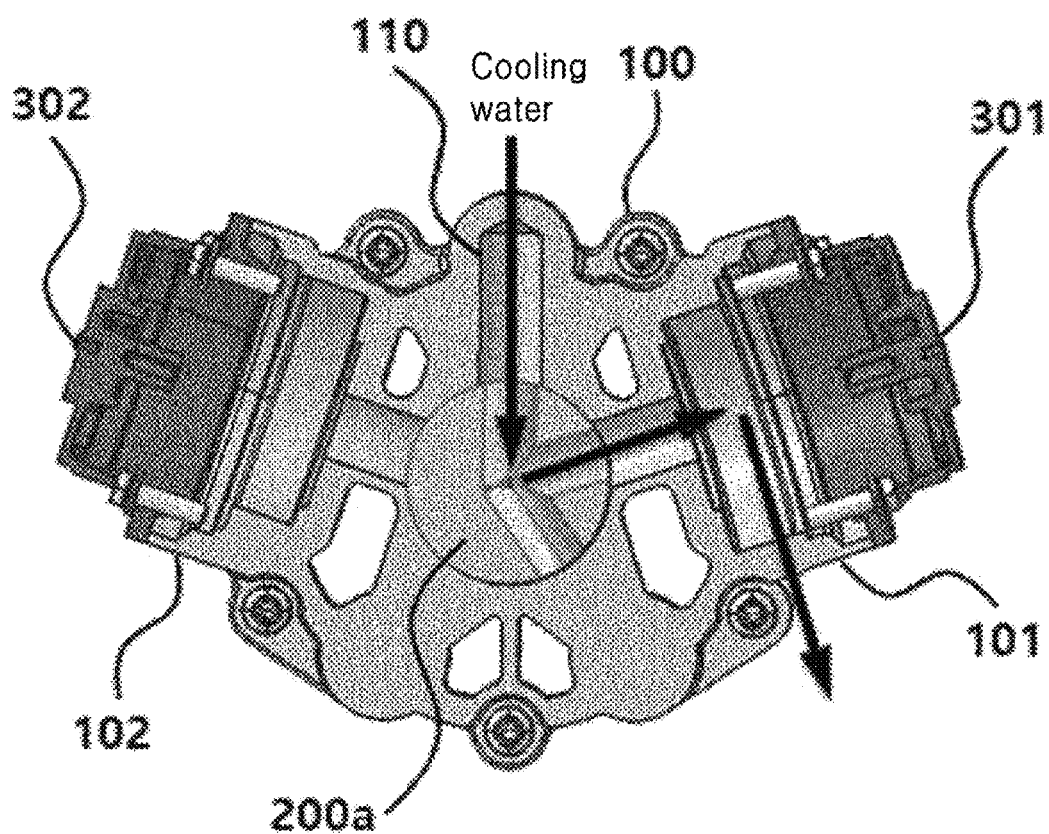

FIGS. 1 and 2 are an assembled perspective view and an exploded perspective view illustrating a coolant control module according to a first exemplary embodiment of the present invention, FIG. 3 is a front cross-sectional view of an assembled state of FIG. 2, and FIGS. 4A and 4B are front cross-sectional views of FIG. 1 illustrating a flow of coolant under control of a control valve in the coolant control module according to the first exemplary embodiment of the present invention.

As illustrated, the coolant control module according to the first exemplary embodiment of the present invention may be configured to largely include a housing 100, a 3-way control valve 200a, a first coolant pump 301, a second coolant pump 302, a driving motor unit 600, and a controller 500, and may further include a driving gear unit 400 connecting a 3-way control valve 200a and the driving motor unit 600 and a cover 700.

The housing 100 may have a coolant inlet 110 into which coolant flows, and a first coolant outlet 121 and a second coolant outlet 122 through which coolant is discharged. The inside of the housing 100 may be provided with an internal passage connecting the coolant inlet 110, the first coolant outlet 121, and the second coolant outlet 122.

In addition, in the housing 100, the first pump mounting part 101 is concavely formed adjacent to the first coolant outlet 121, and the second pump mounting part 102 is concavely formed adjacent to the second coolant outlet 122. For example, the first coolant outlet 121 and the second pump mounting part 102 may be formed symmetrically with respect to a center of the housing 100.

In addition, referring to FIGS. 2 to 4, the housing 100 has a controller mounting part 130 concavely formed to communicate with the inside on an upper side, and a valve accommodating part concavely formed downward from a bottom surface of the controller mounting part 130, and the valve accommodating part 140 may be connected to internal passages.

In addition, a gear unit mounting groove 150 may be formed in a concavely stepped shape between the controller mounting part 130, which is an upper end of the valve accommodating part 140, and the valve accommodating part 140.

The 3-way control valve 200a is provided in the valve accommodating part 140 inside the housing 100 and serves to switch a transfer direction of the coolant.

That is, the passage is formed in the 3-way control valve 200a, and the coolant inlet 110 and the first coolant outlet 121 may be connected or the coolant inlet 110 and the second coolant outlet 122 may be connected according to a position where the 3-way control valve 200a rotates.

The first coolant pump 301 is mounted on the first pump mounting part 101 of the housing 100, and the first coolant pump 301 is connected to the 3-way control valve 200a to serve to pressurize coolant inflowing from the coolant inlet 110 toward the first coolant outlet 121.

The second coolant pump 302 is mounted on the second pump mounting part 102 of the housing 100, and the second coolant pump 302 is connected to the 3-way control valve 200a to serve to pressurize coolant inflowing from the coolant inlet 110 toward the second coolant outlet 122.

The driving gear unit 400 is inserted into and mounted in the gear unit mounting groove 150 of the housing 100, and may be disposed above the 3-way control valve 200a.

In addition, the driving gear unit 400 is provided with gears connected to transmit a torque to the 3-way control valve 200a, and any one of the gears may be coupled to a rotational shaft of the 3-way control valve 200a.

The controller 500 may be, for example, a PCB (printed circuit board) on which electronic elements are mounted, the controller 500 may be inserted into and mounted on the controller mounting part 130 of the housing 100, and the controller 500 may be disposed spaced apart from the upper side of the driving gear unit 400.

Also, the controller 500 may be connected to the first coolant pump 301, the second coolant pump 302, and the driving motor unit 600, respectively, to control their operations. In addition, the controller 500 may be provided with a through hole 510 penetrating through both upper and lower surfaces in the central portion, so a drive shaft of the driving motor unit 600 penetrates through the through hole 510 of the controller 500 to be connected to the driving gear unit 400.

The driving motor unit 600 may be configured to include a motor and a driving gear coupled to a drive shaft of the motor, the driving motor unit 600 may be coupled to the cover 700, and the drive shaft protrudes downward so that the driving gear may be coupled to the drive shaft.

The driving gear of the driving motor unit 600 may be connected to another one of the gears of the driving gear unit 400, and the 3-way control valve 200a may rotate according to the operation of the driving motor unit 600.

The cover 700 may be coupled to the upper end of the controller mounting part 130 of the housing 100, and the open upper side of the controller mounting part 130 may be covered by the cover 700. The driving motor unit 600 may be coupled to the cover 700.

Thus, according to the position where the 3-way control valve 200a rotates, the coolant flowing into the coolant inlet 110 as illustrated in FIG. 4A may sequentially pass through the 3-way control valve 200a and the inside of the second pump mounting part 102 and then may be discharged through the second coolant outlet 122.

As illustrated in FIG. 4B, the coolant flowing into the coolant inlet 110 may sequentially pass through the 3-way control valve 200a and the inside of the first pump mounting part 101 and then may be discharged through the first coolant outlet 121.

In addition, the first pump mounting part 101 of the housing 100 may be provided with a first connector 161 connected to the pump terminal 342 of the first coolant pump 301, and the controller mounting part 130 of the housing 100 may be provided with a second connector 162 connected to the controller 500.

Also, the first connector 161 and the second connector 162 may be connected to each other. Similarly, the second pump mounting part 102 may be provided with the first connector 161 connected to the pump terminal 342 of the second coolant pump 302, and the controller mounting part 130 may be provided with the second connector 162 connected to the controller 500. Also, the first connector 161 and the second connector 162 may be connected to each other.

Therefore, the first coolant pump 301 and the second coolant pump 302 may be electrically connected to the controller 500.

Figure 5:
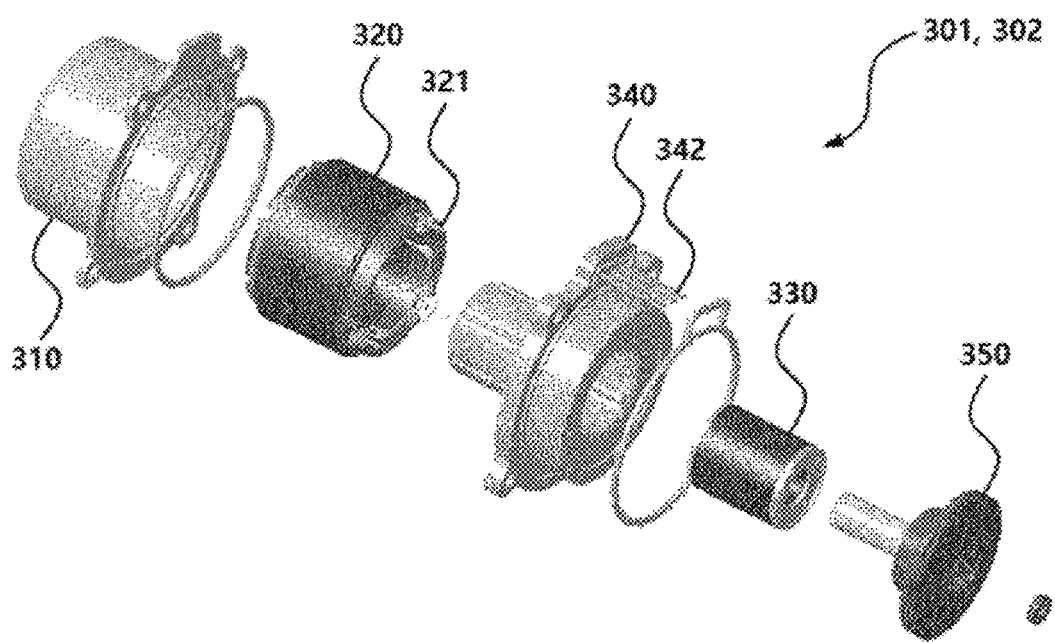
FIG. 5 is an exploded perspective view illustrating a coolant pump in the coolant control module according to the first exemplary embodiment of the present invention.
Figure 6:
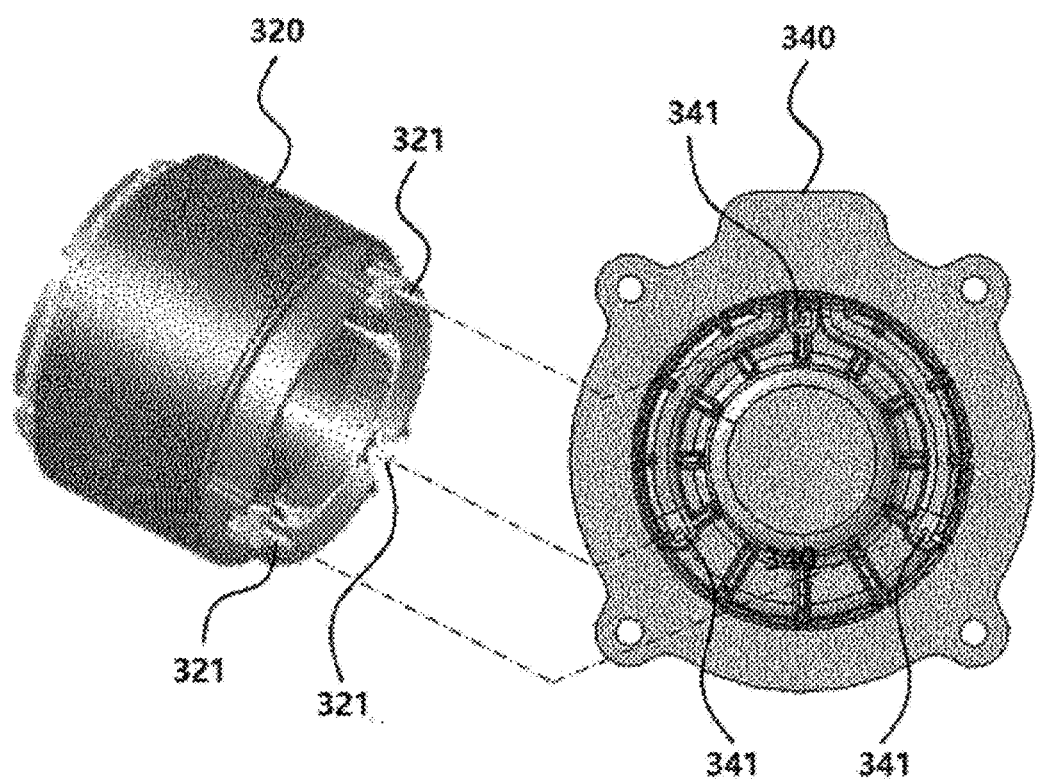
FIGS. 6 and 7 are perspective views illustrating an arrangement structure and a coupling structure of a three-phase terminal of a stator and a pump connector of an impeller housing in FIG. 5.
Figure 7:
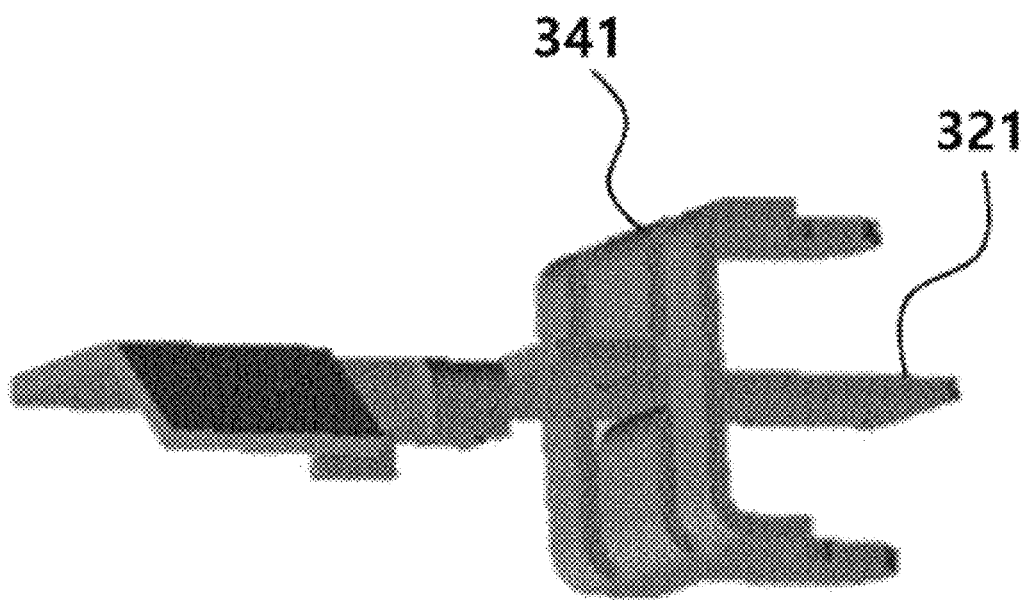

FIG. 5 is an exploded perspective view illustrating a coolant pump in the coolant control module according to the first exemplary embodiment of the present invention, and FIGS. 6 and 7 are perspective views illustrating an arrangement structure and a coupling structure of a three-phase terminal of a stator and a pump connector of an impeller housing in FIG. 5.

As illustrated, the first coolant pump 301 and the second coolant pump 302 may be configured to include a motor housing 310, a stator 320, a rotor 330, an impeller housing 340, and an impeller 350, respectively.

The motor housing 310 may be formed in a container shape with one side closed and the other side open, and the stator 320 may be inserted into and coupled to the motor housing 310. In addition, a 3-phase terminal 321 may protrude from the other side of the stator 320.

The impeller housing 340 may be formed in a form in which a rotor accommodating part protrudes to one side in which the rotor 330 may be accommodated in a flange-shaped mounting part, and the rotor accommodating part may be inserted into the stator 320.

In addition, the rotor 330 is provided inside the rotor accommodating part, and the rotor 330 may be disposed in a spaced apart state from an inner circumferential surface of the rotor accommodating part. In addition, a portion of the impeller 350 may be inserted into and seated in a concave portion of the impeller housing 340, and the impeller 350 may be coupled to the rotor 330 and rotated together.

Here, one side of the impeller housing 340 may be provided with a pump connector 341 connected to the 3-phase terminal 321 of the stator 320 and the other side thereof may be provided with a pump connected to the first connector 161 of the housing 100.

Therefore, when the stator 320 is inserted into the motor housing 310 and then the impeller housing 340 is coupled to the motor housing 310, the 3-phase terminal 321 of the stator 320 and the pump connector 341 of the impeller housing 340 may be coupled and connected at the same time.

In addition, when the first coolant pump 301 and the second coolant pump 302 are mounted on the first pump mounting part 101 and the second pump mounting part 102 of the housing 100, respectively, the first pump mounting part 101 and the second pump mounting part 102 immediately after the coupling is made may be electrically connected to the controller 500.

In addition, for example, as illustrated in FIG. 7, the pump connector 341 of the impeller housing 340 may be formed in a socket shape having a through hole so that the pin-shaped 3-phase terminal 321 may be inserted, and the pump connector 341 may be formed in a structure in which a portion adjacent to the through hole is formed in the form in which a plate is bent and thus the 3-phase terminal 321 is in close contact with and fixed by the elasticity of the plate.

In addition, the first connector 161 of the housing 100 may also be formed in a socket shape so that the pump terminal 342 of the coolant pumps 301 and 302 may be inserted and coupled and electrically connected as described above, the second connector 162 of the housing 100 may be formed in a protruding pin shape, and the controller connector 520 of the controller 500 may also be formed in a socket shape.

In addition, the controller connector 520 of the controller 500 may be formed as a hole vertically penetrating through both surfaces thereof, so the second connector 162 in the pin shape is inserted and then connected by soldering or the like.

In addition, the first pump mounting part 101 of the housing 100 may be provided with a first connector 161 connected to the pump terminal 342 of the first coolant pump 301, and the controller mounting part 130 of the housing 100 may be provided with a second connector 162 connected to the controller 500.

Also, the first connector 161 and the second connector 162 may be connected to each other. Similarly, the second pump mounting part 102 may be provided with the first connector 161 connected to the pump terminal 342 of the second coolant pump 302, and the controller mounting part 130 may be provided with the second connector 162 connected to the controller 500.

Also, the first connector 161 and the second connector 162 may be connected to each other. Therefore, the first coolant pump 301 and the second coolant pump 302 may be electrically connected to the controller 500.

Figure 8:
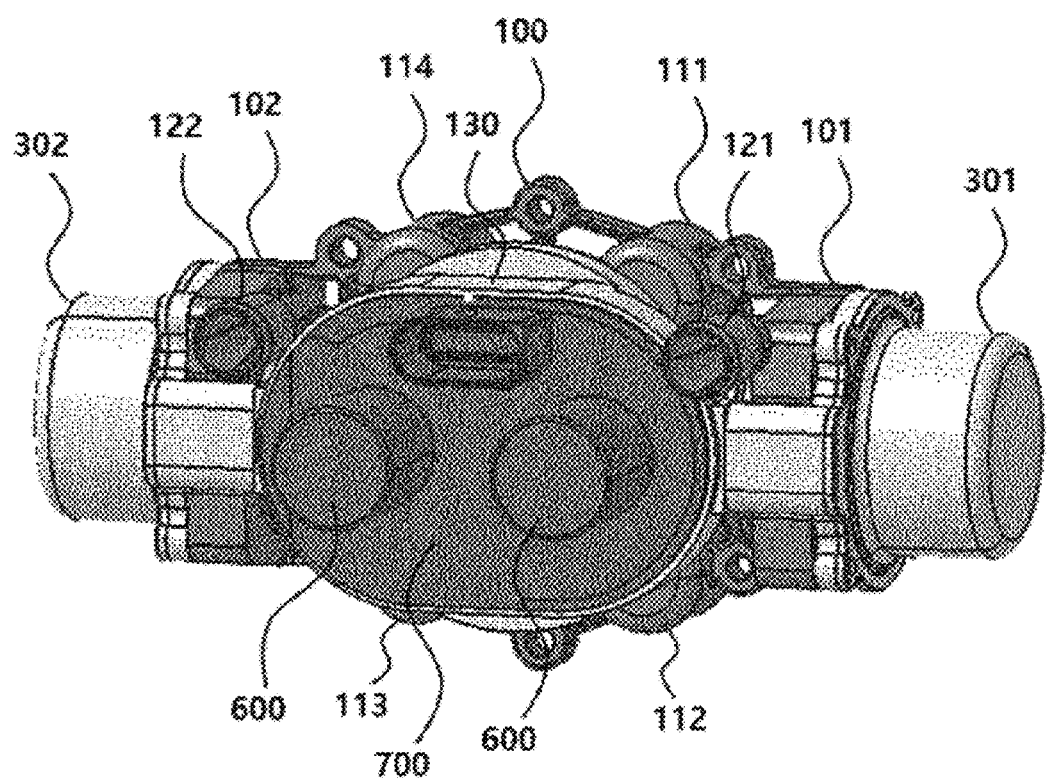
FIG. 8 is an assembled perspective view illustrating a coolant control module according to a second exemplary embodiment of the present invention.

FIG. 8 is an assembled perspective view illustrating a coolant control module according to a second exemplary embodiment of the present invention, and FIGS. 9A to 9D are front cross-sectional views illustrating the flow of coolant under the control of the control valve in the coolant control module according to the second exemplary embodiment of the present invention.

As illustrated, a coolant control module according to a second exemplary embodiment of the present invention may be configured to include a housing 100, a pair of 3-way control valves 200a, a first coolant pump 301, a second coolant pump 302, a pair of driving motor units 600, a controller, and a cover 700, and although not illustrated, may be configured to further include a driving gear unit.

The inside of the housing 100 may be provided with the pair of 3-way control valves 200a, and provided with four coolant inlets and two coolant outlets to correspond to the ports of the pair of 3-way control valves 200a.

That is, in the housing 100, a first coolant inlet 111 and a second coolant inlet 112, which are two coolant inlets connected to the ports of one 3-way control valve 200a, may be formed, and a first coolant outlet 121, which is one coolant outlet, may be formed.

In the housing 100, a third coolant inlet 113 and a fourth coolant inlet 114, which are two coolant inlets connected to the ports of the other 3-way control valve 200a, may be formed, and a second coolant outlet 122, which is one coolant outlet, may be formed.

Also, a pair of driving motor units 600 may be provided to control driving of the pair of 3-way control valves 200a. In addition, the remaining components of the housing 100, that is, the first coolant pump 301, the second coolant pump 302, the controller, the driving gear unit, and the cover 700 may be formed in the same manner as in the first exemplary embodiment described above.

Figure 9A:
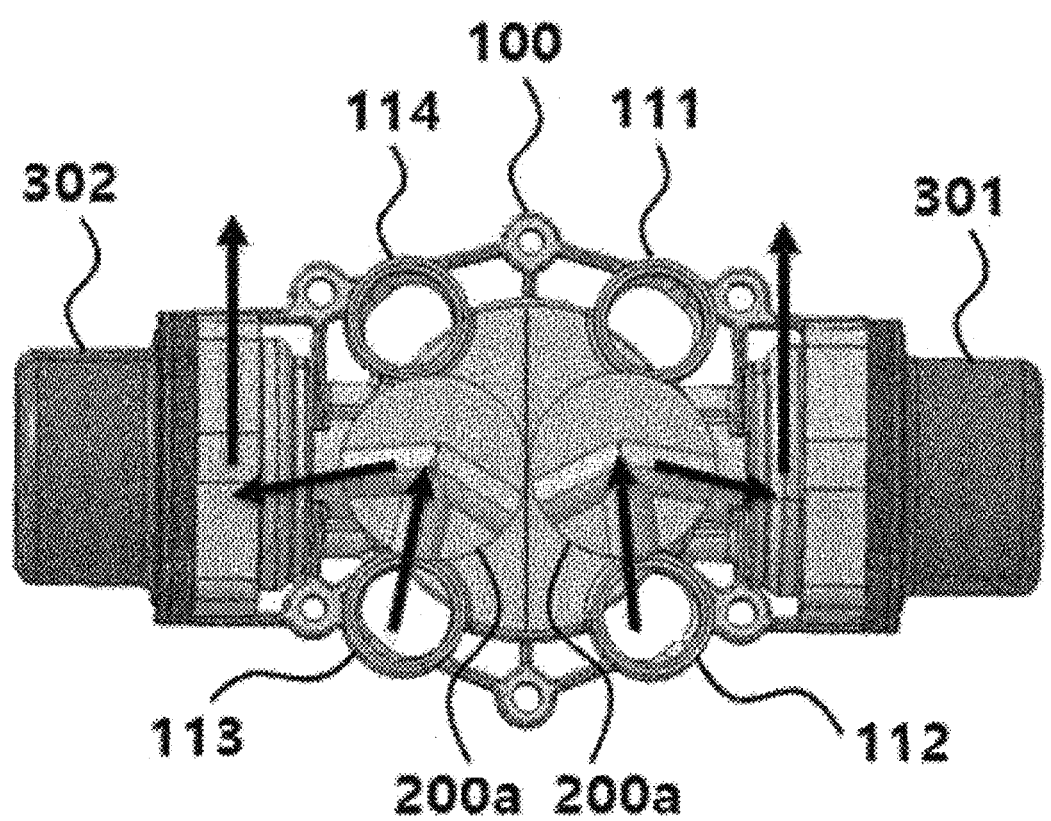
FIGS. 9A to 9D are front cross-sectional views illustrating the flow of coolant under the control of the control valve in the coolant control module according to the second exemplary embodiment of the present invention.

Thus, as illustrated in FIG. 9A, the coolant inflowing through the second coolant inlet 112 may be discharged through the first coolant outlet 121 via the first coolant pump 301, and the coolant inflowing through the third coolant inlet 113 may be discharged through the second coolant outlet 122 via the second coolant pump 302.

Figure 9B:
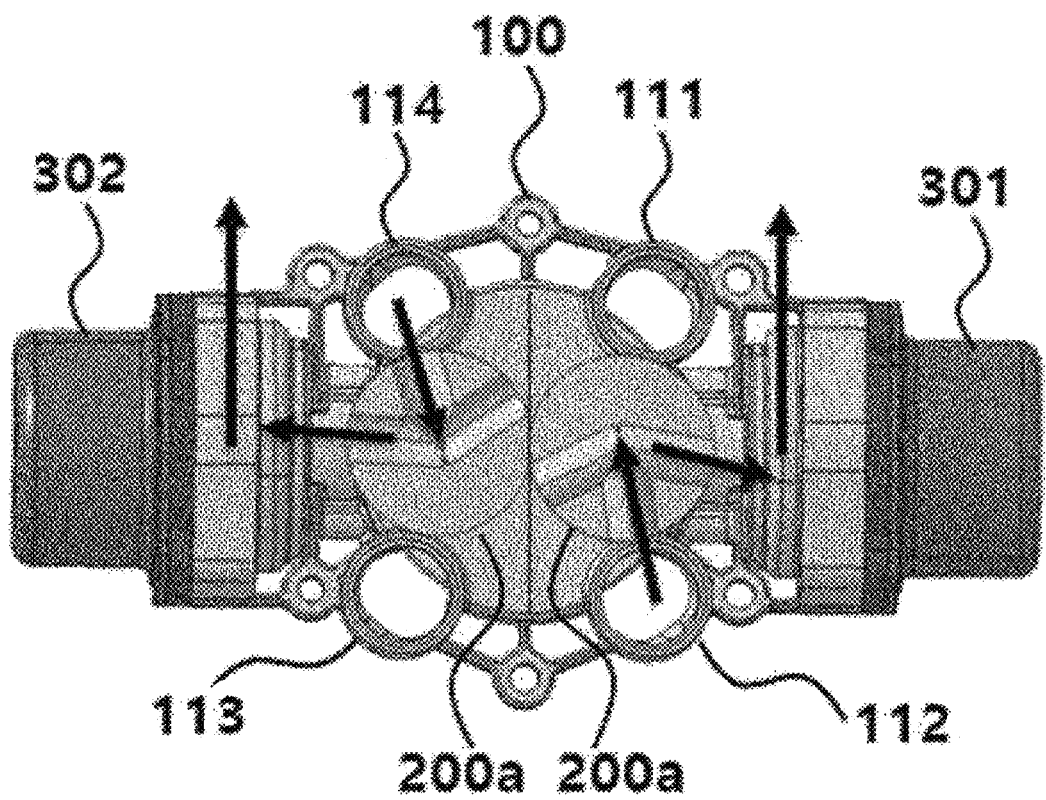

Alternatively, as illustrated in FIG. 9B, the coolant inflowing through the second coolant inlet 112 may be discharged through the first coolant outlet 121 via the first coolant pump 301, and the coolant inflowing through the fourth coolant inlet 114 may be discharged through the second coolant outlet 122 via the second coolant pump 302.

Figure 9C:
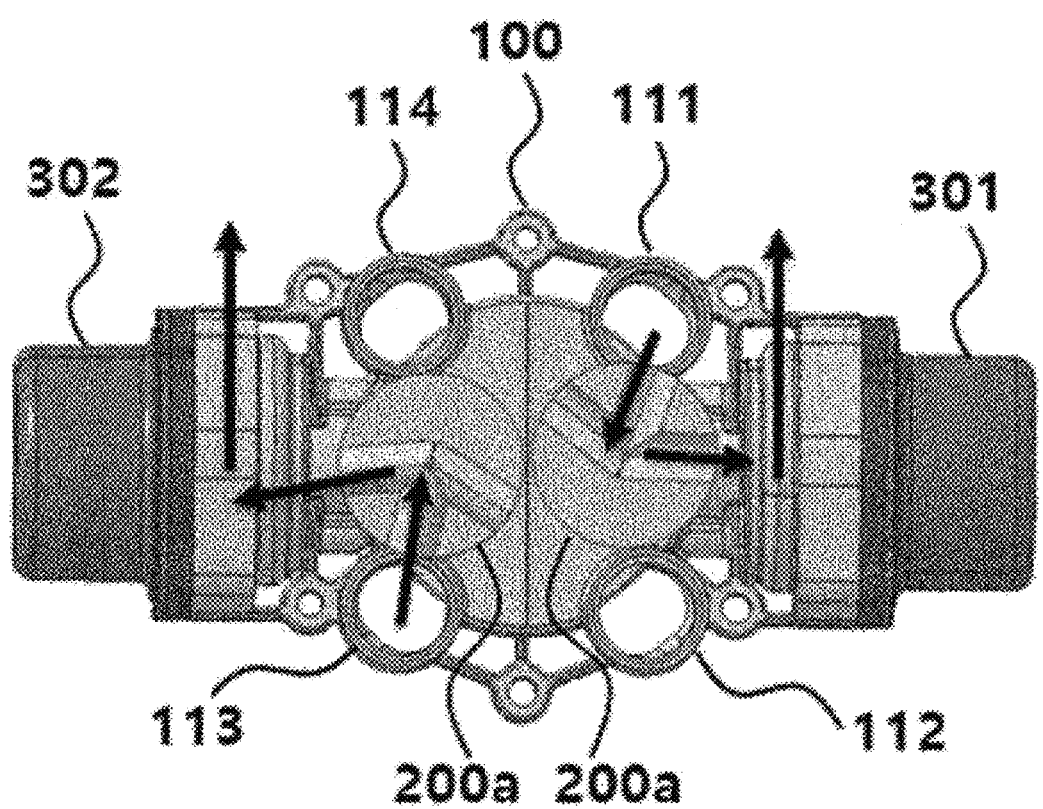

Alternatively, as illustrated in FIG. 9C, the coolant inflowing through the first coolant inlet 111 may be discharged through the first coolant outlet 121 via the first coolant pump 301, and the coolant inflowing through the third coolant inlet 113 may be discharged through the second coolant outlet 122 via the second coolant pump 302.

Figure 9D:
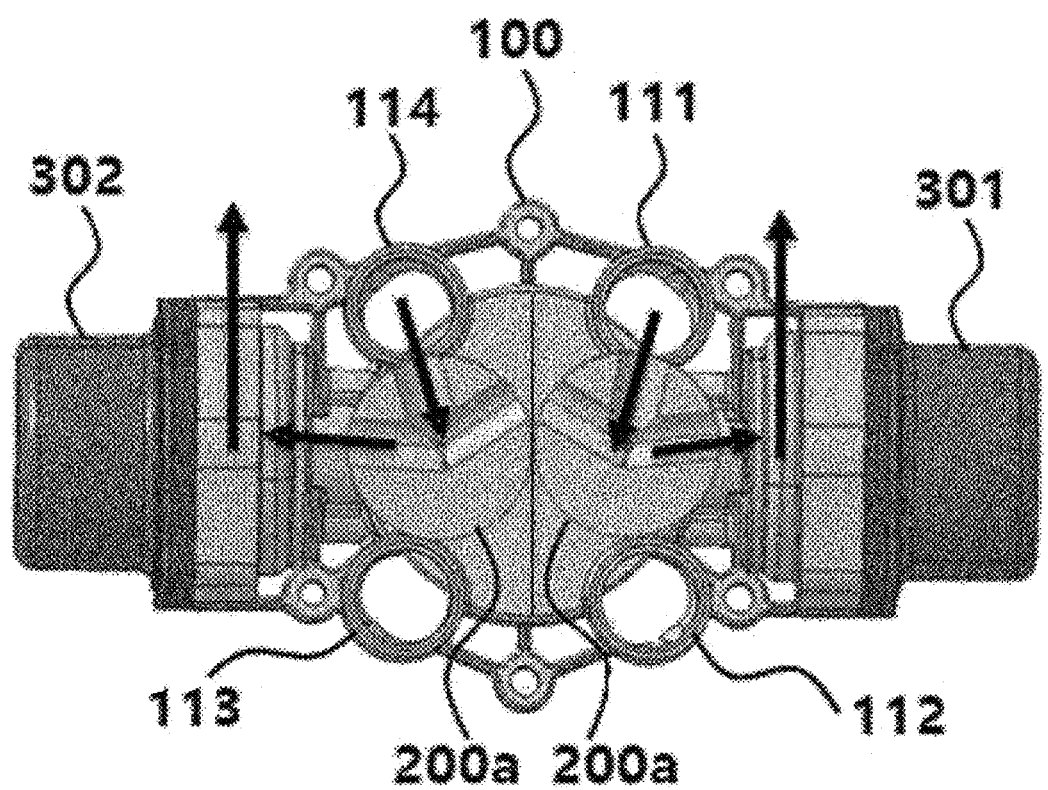

Alternatively, as illustrated in FIG. 9D, the coolant inflowing through the first coolant inlet 111 may be discharged through the first coolant outlet 121 via the first coolant pump 301, and the coolant inflowing through the fourth coolant inlet 114 may be discharged through the second coolant outlet 122 via the second coolant pump 302.

As such, by controlling the pair of 3-way control valves 200a, respectively, it is possible to easily control the flow of coolant through the first coolant pump 301 and the flow of coolant through the second coolant pump 302, respectively.

Figure 10A:
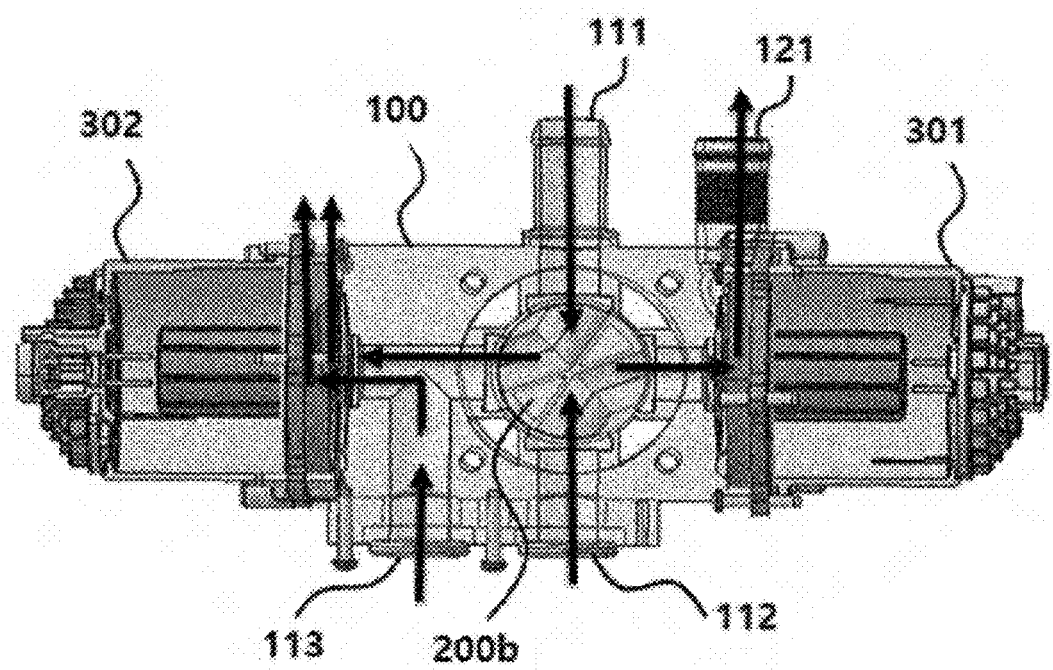
FIGS. 10A and 10B are front cross-sectional views illustrating a flow of coolant under control of a control valve in a coolant control module according to a third exemplary embodiment of the present invention.
Figure 10B:
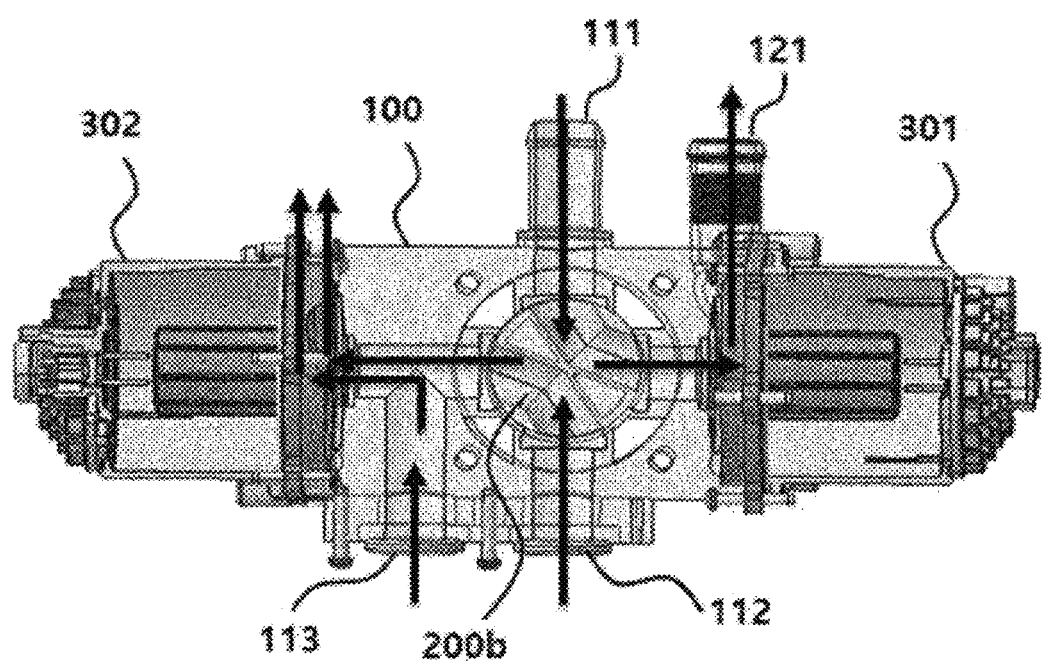

FIGS. 10A and 10B are front cross-sectional views illustrating a flow of coolant under control of a control valve in a coolant control module according to a third exemplary embodiment of the present invention.

As illustrated, a coolant control module according to a third exemplary embodiment of the present invention may be configured to include a housing 100, a 4-way control valve 200b, a first coolant pump 301, and a second coolant pump 302, and although not illustrated, may be configured to further include a controller, a cover, and a driving gear unit.

The inside of the housing 100 may be provided with the 4-way control valve 200b, and provided with two coolant inlets and two coolant outlets corresponding to ports of the 4-way control valve 200b.

That is, the housing may be provided with a first coolant inlet in and a second coolant inlet 112 which are two coolant inlets, and provided with a first coolant outlet 121 and a second coolant outlet 122 which are two coolant outlets.

In addition, the remaining components of the housing 100, that is, the first coolant pump 301, the second coolant pump 302, the controller, the driving gear unit, and the cover may be formed in the same manner as in the first exemplary embodiment described above.

In addition, the housing 100 may be connected to an internal passage on an outlet side of the coolant and provided with a branch passage through which the coolant flows. Accordingly, a third coolant inlet 113 connected to a branch passage may be formed.

Therefore, as illustrated in FIG. 10A, the coolant inflowing through the first coolant inlet 11 and the coolant inflowing through the third coolant inlet 113 may be joined to each other, and discharged through the second coolant outlet 122 via the second coolant pump 302.

In this case, the coolant inflowing through the second coolant inlet 112 may be discharged through the first coolant outlet 121 via the first coolant pump 301.

Alternatively, as illustrated in FIG. 10B, the coolant inflowing through the second coolant inlet 112 and the coolant inflowing through the third coolant inlet 113 may be joined to each other, and discharged through the second coolant outlet 122 via the second coolant pump 302.

In this case, the coolant inflowing through the first coolant inlet 11 may be discharged through the first coolant outlet 121 via the first coolant pump 301.

Figure 11:
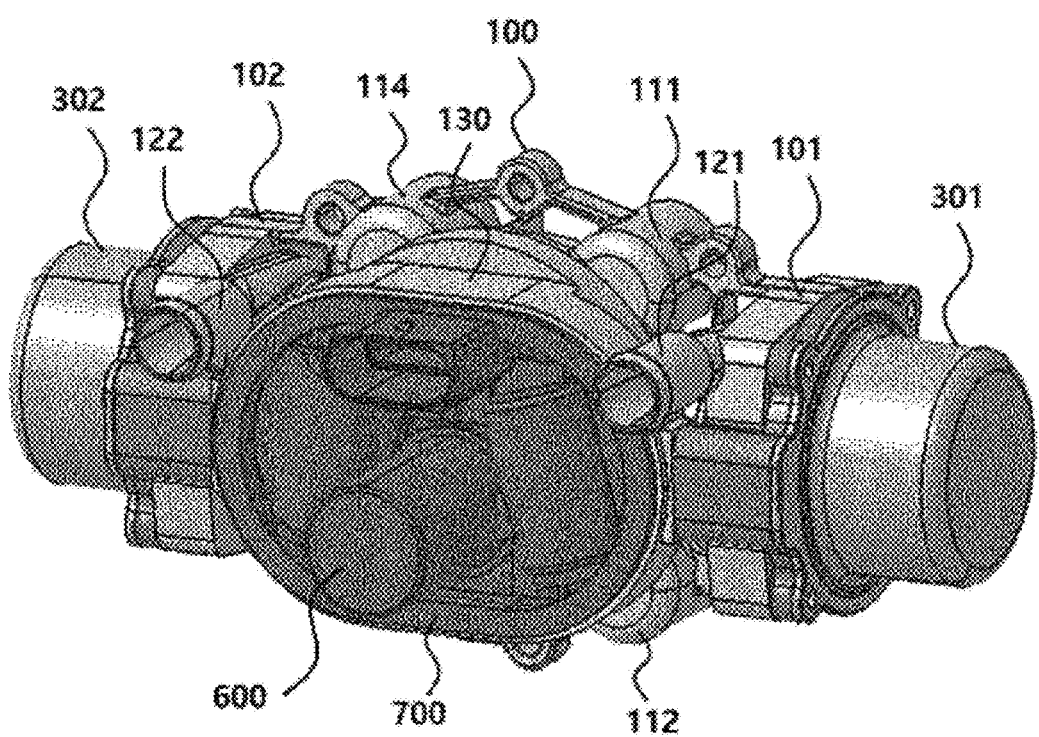
FIG. 11 is an assembled perspective view illustrating a coolant control module according to a fourth exemplary embodiment of the present invention.
Figure 12A:
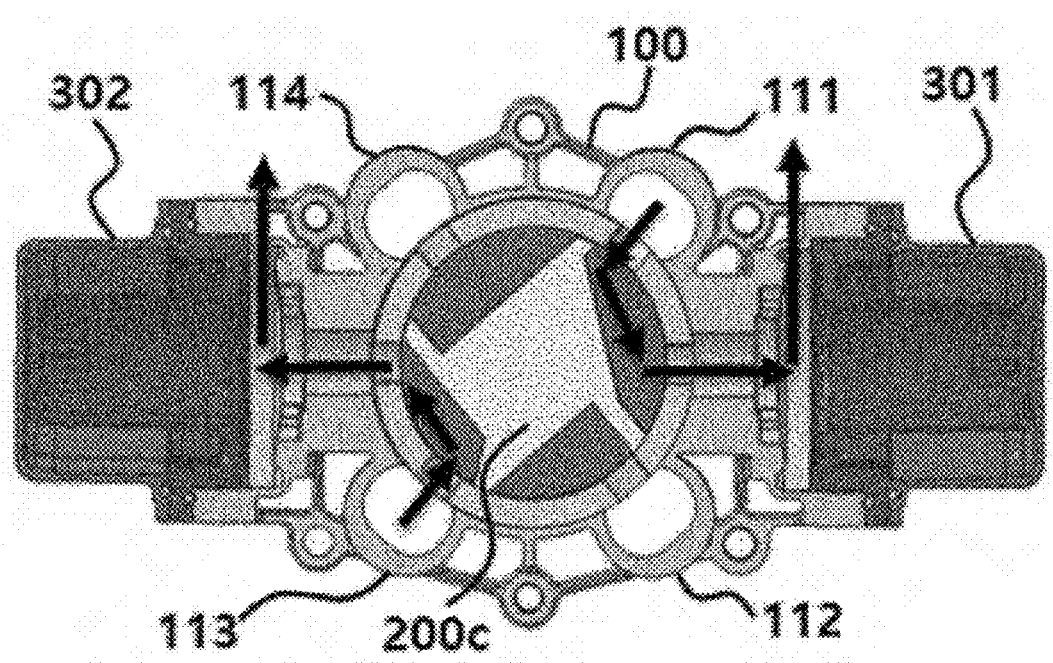
FIGS. 12A to 12C are front cross-sectional views illustrating the flow of coolant under the control of the control valve in the coolant control module according to the fourth exemplary embodiment of the present invention.
Figure 12B:
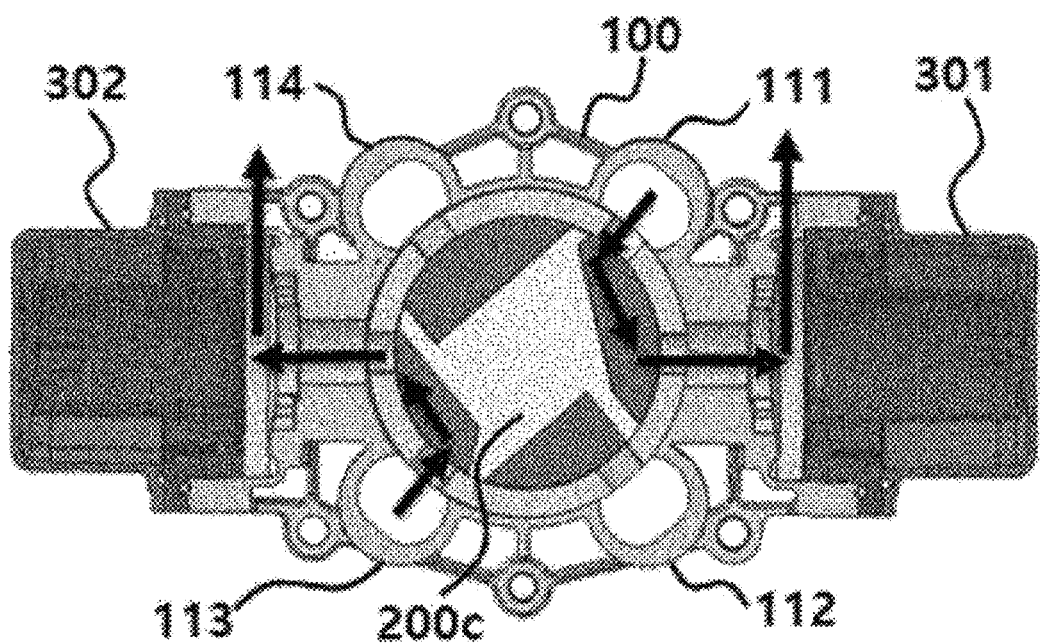
Figure 12C:
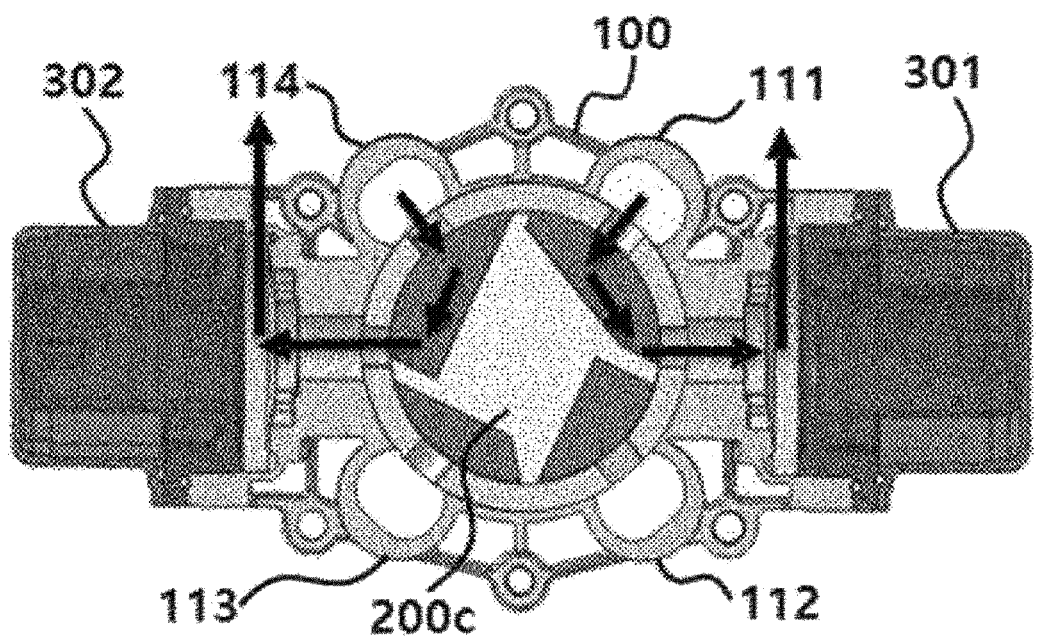

FIG. 11 is an assembled perspective view illustrating a coolant control module according to a fourth exemplary embodiment of the present invention, and FIGS. 12A to 12C are front cross-sectional views illustrating the flow of coolant under the control of the control valve in the coolant control module according to the fourth exemplary embodiment of the present invention.

As illustrated, a coolant control module according to a fourth exemplary embodiment of the present invention may be configured to include a housing 100, a 6-way control valve 200c, a first coolant pump 301, a second coolant pump 302, a driving motor unit 60o, and a cover 700, and although not illustrated, may be configured to further include a controller and a driving gear unit.

The inside of the housing 100 may be provided with the 6-way control valve 200c, and provided with four coolant inlets and two coolant outlets corresponding to ports of the 6-way control valve 200c.

That is, the housing 100 may be provided with a first coolant inlet 11, a second coolant inlet 112, a third coolant inlet 113, and a fourth coolant inlet 114, and provided with a first coolant outlet 121 and a second coolant outlet 122 which are two coolant outlets.

In addition, the remaining components of the housing 100, that is, the first coolant pump 301, the second coolant pump 302, the controller, the driving gear unit, and the cover may be formed in the same manner as in the first exemplary embodiment described above.

Therefore, as illustrated in FIG. 12A, the coolant inflowing through the second coolant inlet 112 may be discharged through the first coolant outlet 121 via the first coolant pump 301, and the coolant inflowing through the fourth coolant inlet 114 may be discharged through the second coolant outlet 122 via the second coolant pump 302.

Alternatively, as illustrated in FIG. 12B, the coolant inflowing through the first coolant inlet 111 may be discharged through the first coolant outlet 121 via the first coolant pump 301, and the coolant inflowing through the third coolant inlet 113 may be discharged through the second coolant outlet 122 via the second coolant pump 302.

Alternatively, as illustrated in FIG. 12C, the coolant inflowing through the first coolant inlet nil may be discharged through the first coolant outlet 121 via the first coolant pump 301, and the coolant inflowing through the fourth coolant inlet 114 may be discharged through the second coolant outlet 122 via the second coolant pump 302.

Figure 13:
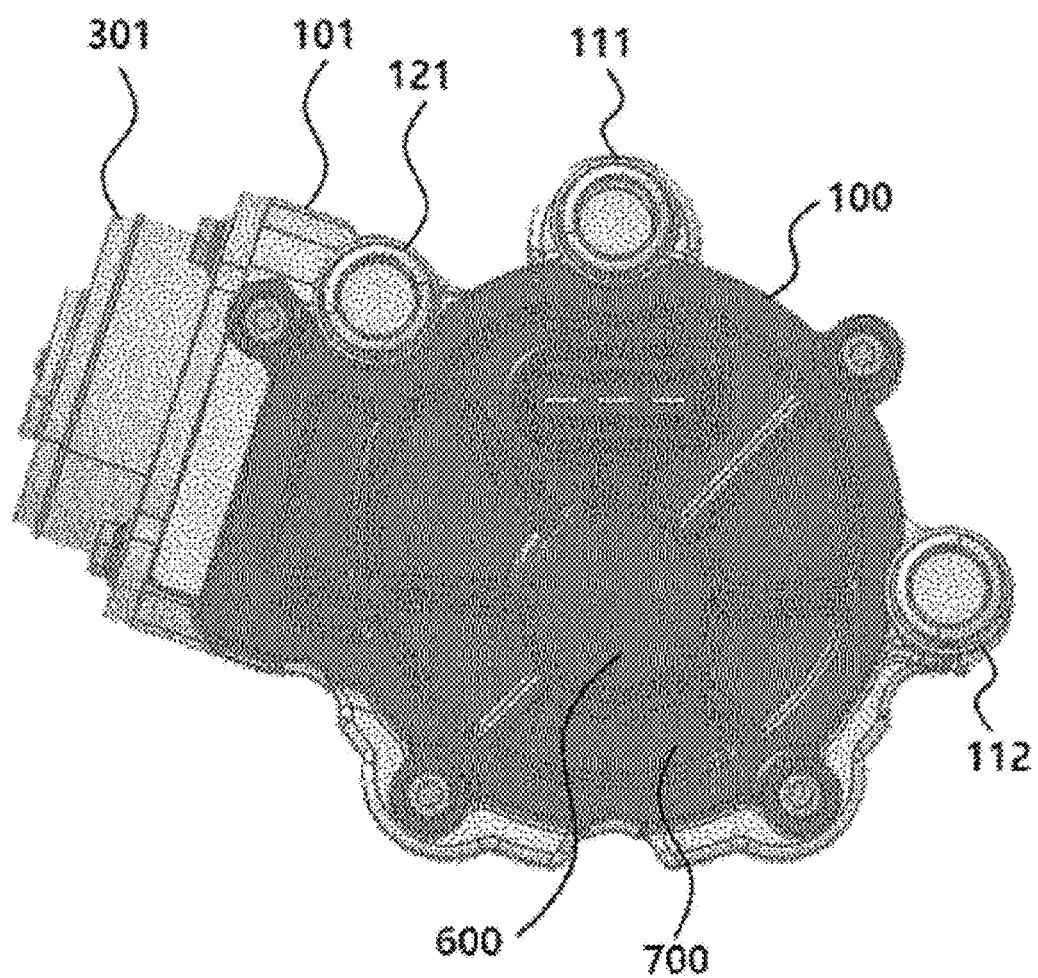
FIG. 13 is a front view illustrating a coolant control module according to a fifth exemplary embodiment of the present invention.
Figure 14A:
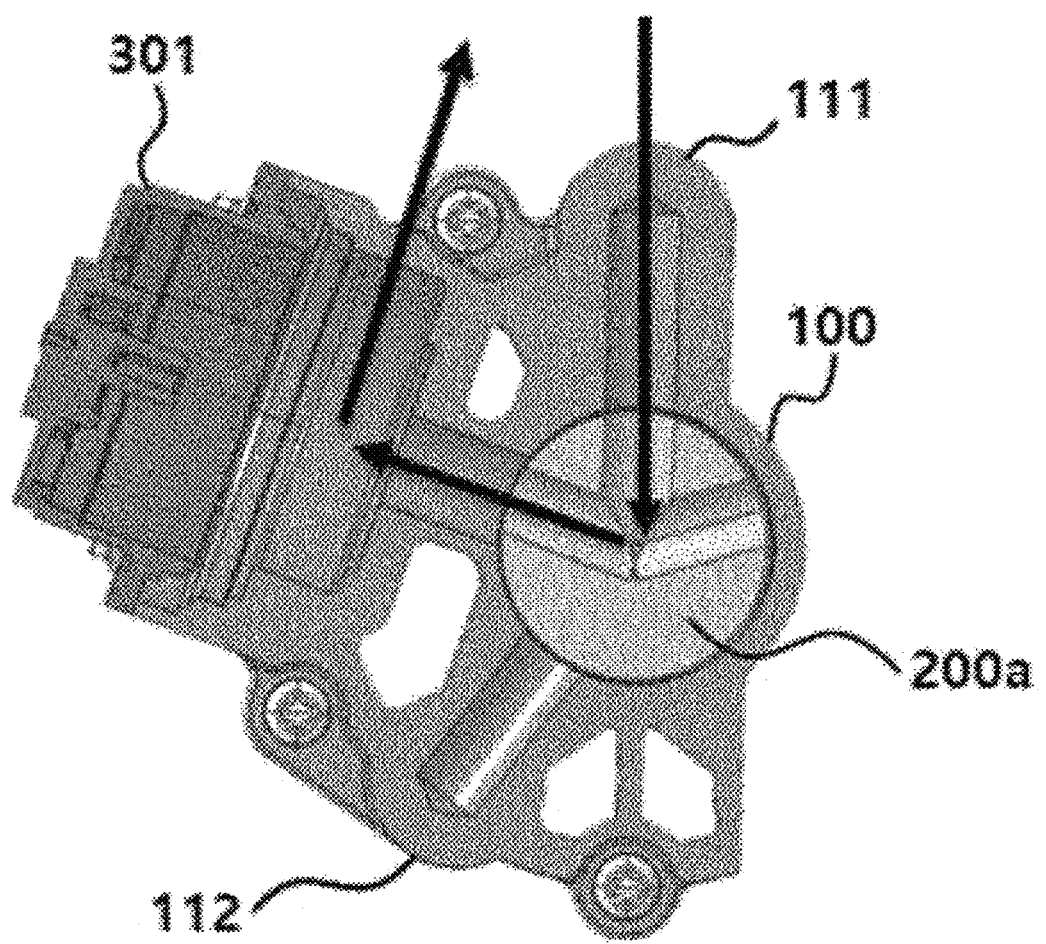
FIGS. 14A and 14B are front cross-sectional views illustrating a flow of coolant under control of a control valve in a coolant control module according to the fifth exemplary embodiment of the present invention.
Figure 14B:
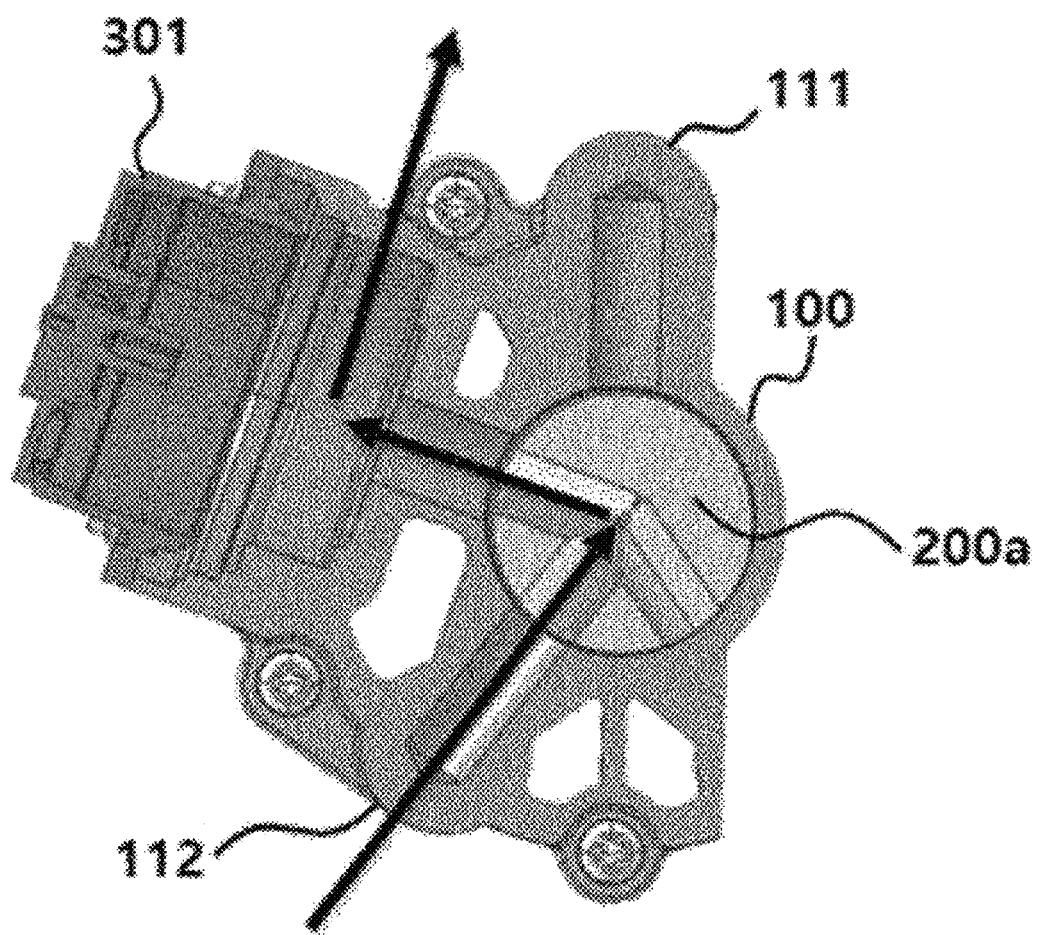

FIG. 13 is a front view illustrating a coolant control module according to a fifth exemplary embodiment of the present invention, and FIGS. 14A and 14B are front cross-sectional views illustrating the flow of coolant under the control of the control valve in the coolant control module according to the fifth exemplary embodiment of the present invention.

As illustrated, a coolant control module according to a fifth exemplary embodiment of the present invention may be configured to include a housing 100, a 3-way control valve 200a, a first coolant pump 301 which is one coolant pump, a driving motor unit, and a cover 700, and although not illustrated, may be configured to further include a controller and a driving gear unit.

An inside of the housing 100 may be provided with the 3-way control valve 200a, and may be provided with two coolant inlets and one coolant outlet corresponding to ports of the 3-way control valve 200a.

That is, the housing may be provided with a first coolant inlet 11 which is two coolant inlets, and provided with a first coolant outlet 121 which is one coolant outlet.

In addition, the housing 100 may be provided with only the first pump mounting part 101 on which the first coolant pump 301 which is one coolant pump is mounted, and since there is no second coolant pump, may not be provided with the second pump mounting part.

In addition, the remaining components of the housing 100, that is, the first coolant pump 301, the controller, the driving gear unit, and the cover may be formed in the same manner as in the first exemplary embodiment described above.

Therefore, as illustrated in FIG. 14A, the coolant inflowing through the first coolant inlet 111 may be discharged through the first coolant outlet via the first coolant pump 301. Alternatively, as illustrated in FIG. 14B, the coolant inflowing through the second coolant inlet 112 may be discharged through the second coolant outlet via the first coolant pump 301.

Figure 15:
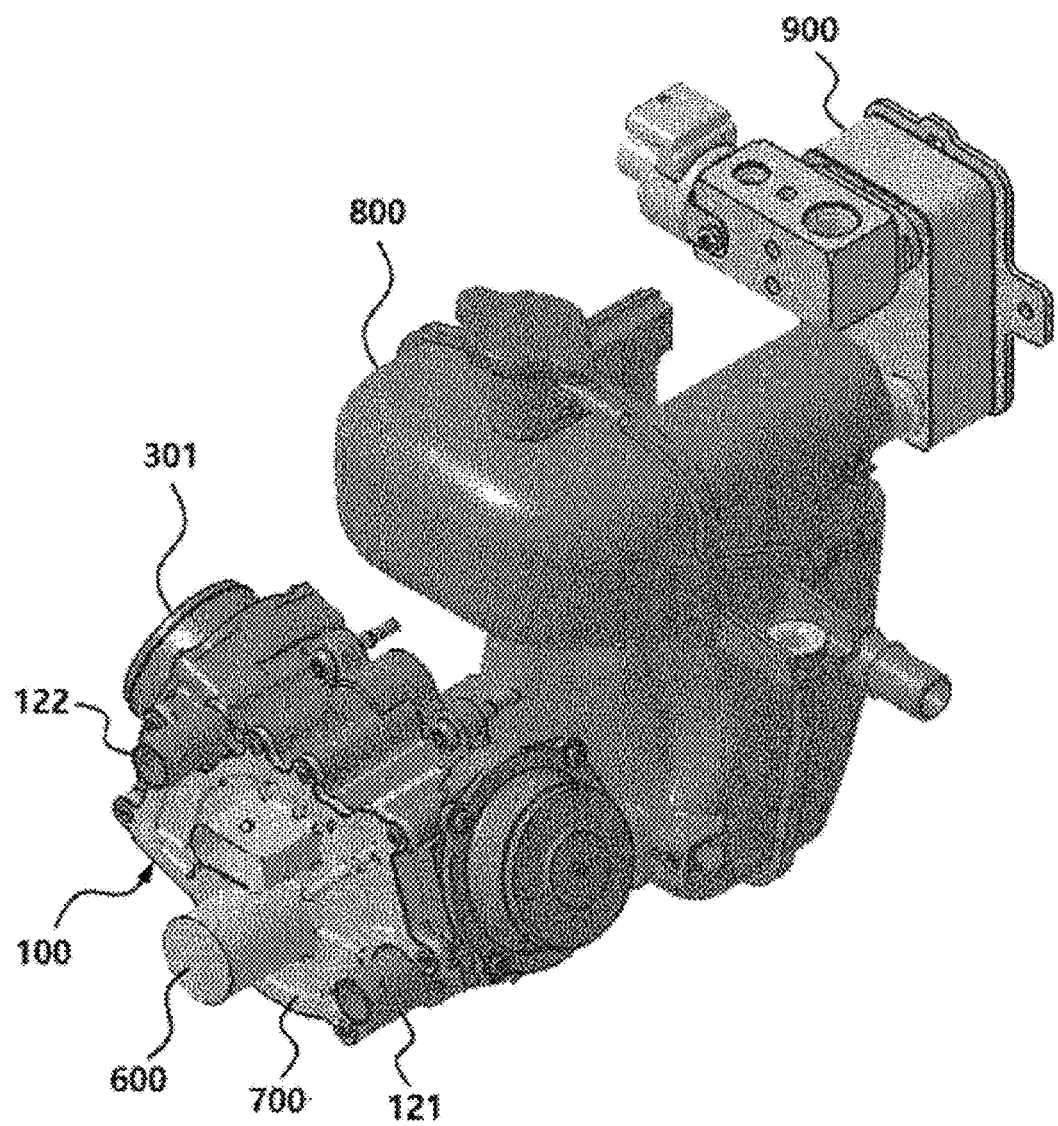
FIG. 15 is an exploded perspective view illustrating a coolant control module further including a reservoir tank according to an exemplary embodiment of the present invention.

FIG. 15 is an exploded perspective view illustrating a coolant control module further including a reservoir tank according to an exemplary embodiment of the present invention.

As illustrated, the coolant control module of embodiments of the present invention further includes a reservoir tank 800 in which coolant is accommodated, and the housing 100 may be coupled to the reservoir tank 800, and the coolant of the housing 100 may be coupled to the reservoir tank 800.

The reservoir tank 800 may be provided with a module mounting part concavely formed on the side to which the housing 100 is coupled, and provided with a coolant outlet, and the housing 100 of the coolant control module may be coupled to the module mounting part of the reservoir tank 800, and the coolant inlet 110 of the housing 100 may be formed to be connected to the coolant outlet of the reservoir tank 800 immediately after the coupling is made.

In addition, the internal space of the reservoir tank 800 is divided so that coolant having different temperatures may be stored and flowed without being mixed, and the reservoir tank 800 may be provided with an outlet through which each coolant is discharged.

Therefore, when the housing 100 has a plurality of coolant inlets, the coolant outlets of the reservoir tank 800 may be connected to different coolant inlets, respectively.

Here, the coolant control module of embodiments of the present invention may be configured to further include a heat exchanger 900 in which heat is exchanged between the refrigerant and the coolant, and the heat exchanger 900 may be coupled to an opposite side of the reservoir tank 800 to which the housing 100 of the coolant control module is coupled.

In this case, the reservoir tank 800 may be provided with a through passage penetrating through both surfaces of the reservoir tank 800 but shielded from an inside where coolant is accommodated, and the coolant inlet of the housing 100 and the coolant outlet of the heat exchanger may be connected through the through passage formed in the reservoir tank 800.

Figure 16:
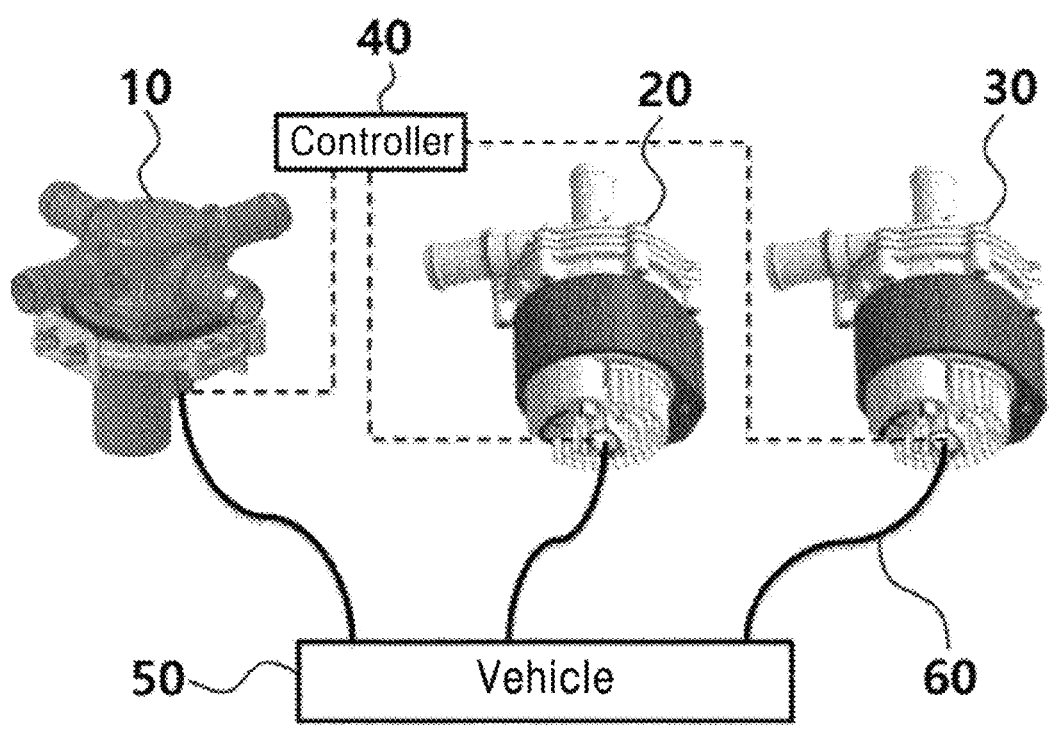
FIG. 16 is a configuration diagram illustrating a connection structure of components constituting the conventional electric device cooling system.

In addition, conventionally, as illustrated in FIG. 16, since the direction control valve 10 and the coolant pumps 20 and 30 are individually mounted on a vehicle and each component is connected with a hose or the like, the components each need to be controlled to a controller 40 to control the operations and wirings 60 need to be made even on the vehicle 50 to connect the components, respectively, so the assembly man-hour and manufacturing cost are increased, and the convenience of mounting parts is decreased.

Figure 17:
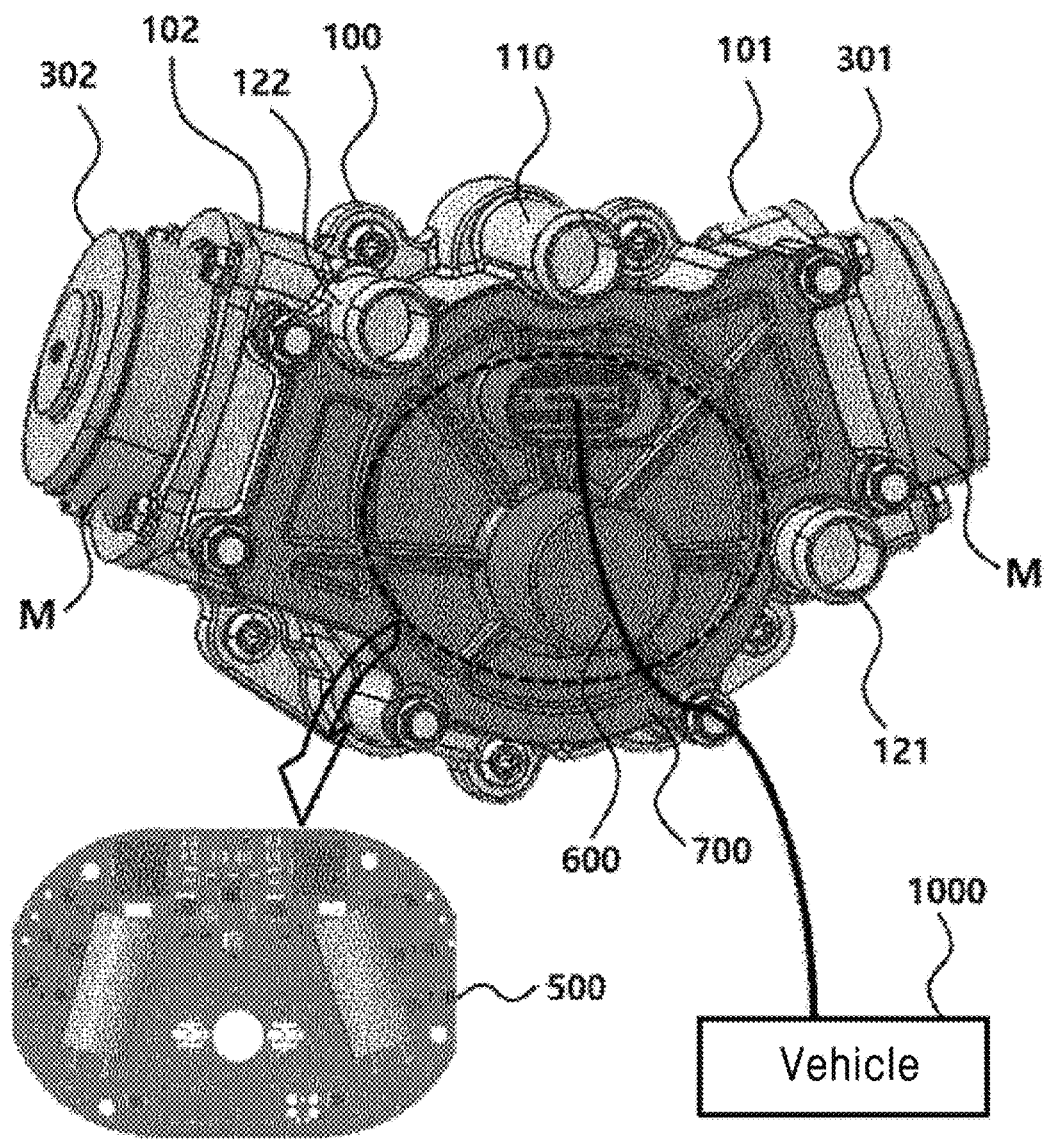
FIG. 17 is a configuration diagram illustrating a structure in which the coolant control module of embodiments of the present invention is electrically connected to a vehicle.

On the other hand, in the coolant control module of embodiments of the present invention, as illustrated in FIG. 17, the control valve and the coolant pumps 301 and 302 are all connected to the controller 500 integrally mounted on the housing 100, and when only the main connector formed in the controller 500 is connected to a vehicle 1000, the number of connectors and wiring for electrical connection may be reduced.

In addition, the controller 500 may be disposed at a location spaced apart from motors M of the coolant pumps 301 and 302, which are the largest source of heat, so it is possible to prevent damage to electronic devices mounted on the controller due to heat generated by the motors and it is possible to be advantageous for cooling the controller.

In addition, due to this arrangement, a separate part such as a heat sink for cooling the controller is not required, so manufacturing cost may be reduced.

According to a coolant control module of embodiments of the present invention, it is possible to reduce a size and weight of a cooling system by removing hoses or pipes or reducing a length of the pipes through integration of parts constituting the cooling system.

In addition, it is possible to reduce the number of parts and assembly man-hours of the cooling system, increase the mounting convenience, and improve the performance and durability of the cooling system. In addition, it is possible to lower the flow resistance of a coolant side acting on the cooling system, and thus, reduce a load applied to a coolant pump.

The present invention is not limited to the abovementioned exemplary embodiments, but may be variously applied. In addition, the present invention may be variously modified by those skilled in the art to which the present invention pertains without departing from the gist of the present invention claimed in the claims.

The invention claimed is:

1. A coolant control module comprising:
   a housing comprising a coolant inlet configured to receive a coolant, a coolant outlet configured to discharge the coolant, an internal passage connecting the coolant inlet and the coolant outlet, and a pump mounting part adjacent to the coolant outlet, wherein a first side of the housing is provided with a controller mounting part in communication with an inside thereof;
   a control valve disposed inside the housing and configured to change a direction of the coolant;
   a coolant pump coupled to the pump mounting part of the housing, wherein the pump mounting part of the housing comprises a first connector connected to a pump terminal of the coolant pump;
   a driving motor unit mounted on the housing, connected to the control valve, and configured to drive the control valve; and
   a controller mounted on the housing, connected to the coolant pump and the driving motor unit, and configured to control an operation of the coolant pump and the driving motor unit, wherein the controller mounting part is provided with the controller, the controller mounting part comprises a second connector connected to the controller, and the first connector and the second connector are connected to each other.

2. The coolant control module of claim 1, wherein:
   the housing comprises a valve accommodating part in the controller mounting part and in communication with the inside; and
   the control valve is inserted into the valve accommodating part.

3. The coolant control module of claim 1, wherein:
   the control valve comprises a 3-way control valve configured to control a flow of the coolant in three directions; and
   the housing is provided with one coolant inlet and two coolant outlets corresponding to ports of the 3-way control valve.

4. The coolant control module of claim 1, wherein:
   the control valve comprises a pair of 3-way control valves each configured to control a flow of the coolant in three directions; and
   the housing is provided with four coolant inlets and two coolant outlets corresponding to ports of the pair of 3-way control valves.

5. The coolant control module of claim 1, wherein:
   the control valve comprises a 4-way control valve configured to control a flow of the coolant in four directions; and
   the housing is provided with two coolant inlets and two coolant outlets corresponding to ports of the 4-way control valve.

6. The coolant control module of claim 5, wherein the housing is connected to an internal passage on an outlet side of the coolant and is provided with a branch passage through which the coolant flows.

7. The coolant control module of claim 1, wherein:
   the control valve comprises a 6-way control valve configured to control a flow of the coolant in six directions; and
   the housing is provided with four coolant inlets and two coolant outlets corresponding to ports of the 6-way control valve.

8. The coolant control module of claim 1, further comprising a reservoir tank configured to accommodate the coolant, wherein the housing is coupled to the reservoir tank.

9. The coolant control module of claim 8, wherein the coolant inlet of the housing is connected to the reservoir tank.

10. A coolant control module comprising:
    a housing comprising a coolant inlet configured to receive a coolant, a coolant outlet configured to discharge the coolant, an internal passage connecting the coolant inlet and the coolant outlet, and a pump mounting part adjacent to the coolant outlet, wherein a first side of the housing comprises a controller mounting part in communication with an inside thereof and a valve accommodating part in the controller mounting part and in communication with the inside;
    a control valve disposed inside the housing and configured to change a direction of the coolant, wherein the control valve is inserted into the valve accommodating part;
    a coolant pump coupled to the pump mounting part of the housing, wherein the pump mounting part of the housing comprises a first connector connected to a pump terminal of the coolant pump;

a driving motor unit mounted on the housing, connected to the control valve, and configured to drive the control valve;

a driving gear unit mounted on the housing and connecting the driving motor unit and the control valve, wherein the driving gear unit is mounted on an inlet side of the valve accommodating part;

a controller mounted on the housing, connected to the coolant pump and the driving motor unit, and configured to control an operation of the coolant pump and the driving motor unit, wherein the controller is mounted on the controller mounting part spaced apart from a first side of the driving gear unit, the controller mounting part comprises a second connector connected to the controller, the first connector and the second connector are connected to each other, and the driving motor unit is disposed on a first side of the controller and is mounted in the housing; and a cover disposed on one side of the controller and coupled to the housing, wherein the driving motor unit is mounted on the cover.

11. The coolant control module of claim 10, wherein:

the controller comprises a through hole penetrating through both sides; and a drive shaft of the driving motor unit passes through the through hole of the controller and is connected to the driving gear unit.

12. The coolant control module of claim 10, wherein the coolant pump comprises:

a motor housing;

a stator disposed inside the motor housing;

a rotor spaced apart from an inside of the stator;

an impeller housing coupled to the motor housing; and an impeller inserted into and seated in the impeller housing and coupled to the rotor and configured to rotate together with the rotor, wherein a first side of the impeller housing is provided with a pump connector connected to a 3-phase terminal of the stator and a second side of the impeller housing is provided with the pump terminal connected to the first connector of the housing.

13. The coolant control module of claim 10, wherein:

the control valve comprises a 3-way control valve configured to control a flow of the coolant in three directions; and the housing is provided with one coolant inlet and two coolant outlets corresponding to ports of the 3-way control valve.

14. The coolant control module of claim 10, wherein:

the control valve comprises a pair of 3-way control valves each configured to control a flow of the coolant in three directions; and the housing is provided with four coolant inlets and two coolant outlets corresponding to ports of the pair of 3-way control valves.

15. The coolant control module of claim 10, wherein:

the control valve comprises a 4-way control valve configured to control a flow of the coolant in four directions; and the housing is provided with two coolant inlets and two coolant outlets corresponding to ports of the 4-way control valve.

16. The coolant control module of claim 15, wherein the housing is connected to an internal passage on an outlet side of the coolant and is provided with a branch passage through which the coolant flows.

17. The coolant control module of claim 10, wherein:

the control valve comprises a 6-way control valve configured to control a flow of the coolant in six directions; and the housing is provided with four coolant inlets and two coolant outlets corresponding to ports of the 6-way control valve.

18. The coolant control module of claim 10, further comprising a reservoir tank configured to accommodate the coolant, wherein the housing is coupled to the reservoir tank.

19. The coolant control module of claim 18, wherein the coolant inlet of the housing is connected to the reservoir tank.

20. A coolant control module comprising:

a housing comprising a coolant inlet configured to receive a coolant, a coolant outlet configured to discharge the coolant, an internal passage connecting the coolant inlet and the coolant outlet, a pump mounting part adjacent to the coolant outlet, wherein a first side of the housing is provided with a controller mounting part in communication with an inside thereof;

a control valve disposed inside the housing and configured to change a direction of the coolant;

a coolant pump comprising a motor housing, a stator disposed inside the motor housing, a rotor spaced apart from an inside of the stator, an impeller housing coupled to the motor housing, and an impeller inserted into and seated in the impeller housing and coupled to the rotor and configured to rotate together with the rotor, wherein the coolant pump is coupled to the pump mounting part of the housing, the pump mounting part of the housing comprises a first connector connected to a pump terminal of the coolant pump, and a first side of the impeller housing is provided with a pump connector connected to a 3-phase terminal of the stator and a second side of the impeller housing is provided with the pump terminal connected to the first connector of the housing;

a driving motor unit mounted on the housing, connected to the control valve, and configured to drive the control valve; and a controller mounted on the housing, connected to the coolant pump and the driving motor unit, and configured to control an operation of the coolant pump and the driving motor unit, wherein the controller mounting part is provided with the controller, the controller mounting part comprises a second connector connected to the controller, and the first connector and the second connector are connected to each other.

* * * * *